United States Patent Office 3,440,054
Patented Apr. 22, 1969

3,440,054
PRODUCTION OF PROTEINATES
Louis Sair, Evergreen Park, Ill., assignor to The Griffith Laboratories, Inc., Chicago, Ill., a corporation of Illinois
No Drawing. Filed Mar. 5, 1964, Ser. No. 349,735
Int. Cl. A23j 1/22; C07g 7/00
U.S. Cl. 99—14                    18 Claims

ABSTRACT OF THE DISCLOSURE

Production of dry neutralized proteinates by reacting hydrophilic protein with alkali or alkaline earth metal hydroxides in the presence of sufficient water to effect reaction with said protein and prior to decomposition of the protein and thereafter drying. Mechanical pressure and heat may be applied before drying.

---

The present invention relates to natural proteins, and in particular, to modifying those natural proteins which hydrate and thereby absorb water.

Such proteins are herein referred to as hydrophilic proteins, thus to distinguish them from those which do not hydrate, for example, the sclero proteins of which hair, nails, horn, hoofs, and scales are illustrative.

Proteins in general are large molecular structures having short and long chains carrying mixtures of long and short chains of amino acids. The physical and chemical properties depend upon the molecular structure, as a result of which nature provides a great variety of proteins. A few in natural form are readily water-soluble. Those which have a minimum solubility can be rendered more soluble by elevating the pH from the isoelectric point of minimum solubility. This is conventionally done by the reacting the protein in aqueous suspension with alkal, such as the hydroxides of alkali-metals, alkaline earth metals and ammonium, and other water-soluble alkaline salts, such as alkali-metal carbonates, and various phosphate and polyphosphate salts and spray-drying the product.

In addition, some proteins are temperature-sensitive and at elevated temperatures they are denatured, i.e., lose their solubilities and lose at least part of their capacity to hydrate. A classical example of denaturing is the coagulation of egg albumen to egg-white. Before coagulation the protein is completely soluble in water. After coagulation it is insoluble in water. The myosin of meat is another example of denaturable protein.

Heretofore, it has been the conventional practice to treat hydrophilic proteins, such as casein, soybean protein, peanut-meal, and the like, with alkali to increase the solubility in water. One reason for this is to make glues and adhesives. Another is to prepare edible protein products. This is usually accomplished by suspending the protein in water, sometimes at its isoelectric point, then adding the alkali until the desired elevation of the pH takes place. Because of the amino-acid content, the pH may be elevated toward, to, and past the neutral pH of 7, there being no precise end-point in neutralizing.

Said practice is illustrated by reference to casein. As casein, the protein has little direct use, and is, therefore, utilized by increasing its solubility, commonly with sodium hydroxide where food uses are intended. Where skim milk is economically available the casein is usually precipitated by use of acid, settled, washed by decantation, then the water suspension at or near its isoelectric point of pH to 4.4 is neutralized to the desired pH, and then the aqueous mass is spray-dried or drum-dried. When the pH of a solution is in the neutral range of 6.5 to 7.5, the solution is viscous, and to be handled, its concentration is limited to a range of about 14% to 20%.

Where skim milk is not available, commercial casein, which is a dried form of casein at its isoelectric point, is suspended in water in the ratio by weight of 1 part of casein to 5 to 7 parts of water. This may be pasteurized by heating and then the pH is adjusted and the product dried as described above.

The drying of proteins as above described involves evaporating large amounts of water relative to recovered protein, in addition to the difficulties of handling thick and viscous solutions. At 20% concentration in water, alkali-metal caseinate is so viscous that it is very difficult to dry.

The present invention overcomes the above disadvantages by avoiding thick or viscous solutions, even avoiding solutions, by minimizing the amount of water to be evaporated in forming dry neutralized protein.

It is the general object of the invention to form initially for the purpose of producing a dry soluble or insoluble form, a neutralized hydrophilic protein in a solid state of hydration.

It is a particular object of the invention to neutralize hydrophilic protein while in a solid state in the presence of a limited amount of water and with an hydroxide of alkali-metal or alkali-earth metal.

It is also an object of the invention to alter the characteristics of neutralized protein by subjecting a hydrated solid form to mechanical pressure during or after neutralization.

It is also an object of the invention to provide edible proteinaceous material, such as snacks.

Various other and ancillary objects and advantages of the invention will appear hereinafter.

Although the invention is applicable generally to hydrophilic proteins, it is herein explained by reference to processing food proteins, in particular, casein and soybean protein. These are used as food supplements, and as emulsifying agents, especially sodium and calcium caseinates for producing meat products.

An analytical method has been devised for developing the present invention, which is also useful in practicing the invention. It is known that sodium hydroxide (NaOH) is soluble in ethyl alcohol (96% by volume) and that sodium caseinate is not. Thus, having a three-component solid state initially consisting of commercial casein, NaOH and free water, a specimen thereof can be extracted with alcohol and filtered, and the filtrate titrated with acid to an end-point with phenolphthalein. This will give the content of unreacted NaOH in the mass.

It has been found that when commercial casein (6% to 12% moisture content) is treated with a neutralizing quantity of NaOH as a 50% solution, the neutralization takes place only gradually. To illustrate, on adding 4 ml. of 50% NaOH solution to 100 grams of such casein, and analyzing for NaOH after 1 hour, it is found that the initial neutralization at the surface of dry particles about 25% of the NaOH is unreacted. It is assumed that when the above procedure is followed, and the mass allowed to stand overnight, it is found that all the alkali has reacted. However, foul odor including that of ammonia is present, indicating that protein decomposition has occurred, which results from the slow action of free caustic soda on neutralized casein.

The foregoing facts indicate that the neutralization should not extend over long periods of time and should be complete soon after adding the alkali solution to the solid state casein and before decomposition can take place. The present invention is based on the discovery that the presence of free water in the casein being neutralized is necessary to effect prompt and complete reaction. This may be accomplished by first moistening the casein, as with water or a neutral non-reactive aqueous solution, preferably before adding the alkali, or by using water containing the hydroxide, such as that of sodium or calcium. The neutralized mass will contain total water derived from the moisture content of the commercial casein, the moistening water, and the water providing the alkali. To produce an easy-drying semi-dry crumbly mass of neutralized casein, the mass should have at least 60% solids and preferably 80% solids. Except for the water content of the commercial protein, the remaining water content may be variously distributed. The water content may be effected in several ways, including first moistening the protein then adding dry soluble hydroxide or dissolved hydroxide; or by adding dry soluble hydroxide to the protein and then adding water; or by using the desired amount of water carrying the hydroxide.

When commercial dry protein is not used, as in the case of casein prepared from fresh milk or soy protein solids suspended in water, the filtered or decanted protein usually at or near its isoelectric point is partially dried to retain sufficient free water in amount comparable to what otherwise would be added to the dry protein.

It is believed that the hydration of the dry casein resulting from the presence of free water, forms free water channels into the interior of the casein bodies, in which channels dissolved alkali can flow for neutralization, at the same time adding water of an alkaline solution to enlarge the channels.

The amount of water required for complete reaction with commercial proteins, such as casein, depends upon the initial moisture content, granulation of the protein, and other factors. When commercial casein containing 7.6% of water was used, the following Table I shows water to effect complete reaction without decomposition.

100 gm. of casein was used having a particle-size-distribution as follows:

Mesh: Percent

On 20 _____ 0
On 40 _____ 31
On 60 _____ 56
Thru 60 _____ 13

The water in amounts shown in Table I was first added and allowed to hydrate the casein uniformly, to give a free-flowing mass. Then the fixed amount of 50% NaOH solution was added. Then after 10 minutes a specimen was extracted and titrated for free alkali, expressed in terms of titre, being ml. 0.1 N sulfuric acid for a 10 gm. sample. The results in terms of odor after 24 hours are given:

TABLE I

| Example | Ml. H$_2$O | Ml. NaOH sol. | Titre | Odor |
|---|---|---|---|---|
| 1 | 0 | 3.5 | 2.1 | Bad, ammonia. |
| 2 | 3 | 3.5 | 5.1 | Do. |
| 3 | 5 | 3.5 | 1.6 | Do. |
| 4 | 7 | 3.5 | 1.3 | Slight, ammonia. |
| 5 | 10 | 3.5 | 0.4 | Good. |
| 6 | 18 | 3.5 | 0 | Do. |

In example 5, the total amount of water is 16.35 parts and the total of dry solids is approximately 94.15 parts, or 10.4 parts to 60 parts of solids. Using the same casein as used for Table I it is seen as in Example No. 5 that when 1 part of water is used for 10 parts of casein the caustic soda solution quickly neutralizes and avoids decomposition. This is the preferred procedure as it gives easily workable masses. Complete neutralization may also be quickly accomplished by mixing in the alkali first, preferably when it is dry, as is calcium hydroxide, then adding the water. All the water may be used to dissolve the alkali and the solution added. But, as the ratio of alkali to protein increases, and as the ratio of free water to protein decreases, or both together, limits will be found where the reaction is not quick and free from decomposition. The particle-size of the protein also influences the limits which would be found. Given protein of a size, simple experiments can determine limits for any chosen procedures or amounts if water and alkali are to be used. However, to avoid such empirical testing, it is preferred to add sufficient water first, and when using caustic soda, to fix upon a 50% solution thereby leaving more water for first moistening the protein.

This is illustrated in part by Table II continuing the test series of Table I. The 50% NaOH solution used in Table I was combined with varying amounts of water.

TABLE II

| Example No. | NaOH Solution | | Odor after 24 hours |
|---|---|---|---|
| | Ml. 50% sol. | Ml. H$_2$O | |
| 7 | 3.5 | 3 | Bad. |
| 8 | 3.5 | 7 | Bad. |
| 9 | 3.5 | 10 | Good. |
| 10 | 3.5 | 12 | Good. |

When calcium hydroxide is used as the alkali, it having a low solubility in water, it is possible to mix the dry protein and the dry calcium hydroxide first and then add water.

It has been discovered further that when the crumbly neutralized mass is mechanically compressed with high pressure, its physical form can be changed from opaque to glassy as the total water content is increased. It has also been found that the glassy forms have better emulsifying qualities than the non-glassy forms having the same proportions of reacted alkali and protein. It is supposed that the amount of free water coupled with the pressure may change the loci of neutralization in the molecule, giving different properties.

The following Table III shows the results of pressure on equally neutralized protein samples varying only in total water content. To 100 grams of 30-mesh commercial casein (from New Zealand) is added the amounts of water shown in column 2. Then to each sample was added 4 ml. of 50% NaOH solution. Column 3 shows the water content as determined by oven-drying at 100° C. overnight with loss of all water. Column 4 shows the visual character of the products after forming pellets at 15,000 pounds mechanical pressure for 5 minutes in a laboratory Carver press.

TABLE III

| 1 | 2 | 3 | 4 |
|---|---|---|---|
| Example | Ml. H$_2$O | Percent H$_2$O | Pellets |
| 11 | 0 | 13.3 | White, opaque. |
| 12 | 3 | 15.3 | Do. |
| 13 | 6 | 17.4 | Do. |
| 14 | 12 | 21.3 | White, opaque, slight translucency in spots. |
| 15 | 24 | 27.9 | Do. |
| 16 | 30 | 31.8 | About 60% white-opaque with remainder going translucent. |
| 17 | 35 | 33.8 | 10% opaque, 90% translucent. |
| 18 | 40 | 37.0 | 99% translucent, 1% opaque. |
| 19 | 50 | 40.0 | 100% translucent, very hard pellet. |
| 20 | 60 | 44.0 | 100% translucent. The pellet is much softer than Preparation No. 19. |

The degree of pressure on semi-dry neutralized protein determines in part the amount of water required to obtain the glassy product from a rapidly neutralized protein. In Table III using a laboratory Carver press of low-capacity 35 ml. of H$_2$O was required for 100 gms. of casein to obtain translucency. The material of the following Examples 21–23 was compressed between high-capacity commercial pressure rolls, showing that translucency can be obtained with considerably less water.

Examples 21, 22 and 23

The following series shows the effect of increasing amounts of water, using the basic formulation:

| | Parts by weight |
|---|---|
| Commercial dry casein | 100 |
| 50% NaOH solution: | |
| NaOH | 1.67 |
| Water | 1.67 |
| Water (see below) | X |

| Example | Parts X | Character of neutralized mass |
|---|---|---|
| 21 | 2.61 | Free-flowing. |
| 22 | 7.85 | Essentially free-flowing. |
| 23 | 13.05 | Tendency to be gluey. |

The water was added to the casein and mixed for 10 minutes until the product changes from a moist to a dry state. Then the alkali was added and mixed for 10 minutes, during which time the reaction is still incomplete in the case of Example 19. Then the products were immediately passed through heavy squeeze rolls delivering sheets. It has been found that compacting the mass before neutralization is complete hastens the reaction and no doubt controls where in the molecule the neutralization is effected. The sheets were as follows:

Example 21.—Opaque

Example 22.—Spotted opaque and translucent

Example 23.—Translucent and glassy

The sheets were dried in an air-stream to about 7% H₂O and ground to pass an 80-mesh, with properties as follows:

TABLE IV

| Example | pH | Percent moisture | Percent protein | Comparative viscosity (centipoises) |
|---|---|---|---|---|
| 21 | 6.9 | 6.2 | 89.0 | 190 |
| 21 | 6.9 | 6.2 | 89.0 | 190 |
| 22 | 6.8 | 8.0 | 88.5 | 550 |
| 23 | 6.8 | 8.3 | 86.8 | 1,450 |
| Control [1] | 7.0 | 4.2 | 89.7 | 270 |

[1] A spray-dried sodium caseinate.

The variation in viscosity in these three preparations shows how neutral casein can be varied by the moisture content in the semi-dry state and as the protein under pressure is converted to an opaque-to-translucent sheet.

The three products of Examples 21 to 23 were compared with the spray-dried sodium caseinate by use as emulsifiers in comminuted meat. They compared as follows:

Example 21.—Inferior
Example 22.—Superior
Example 23.—Superior

The superior emulsifying properties of Examples 22 and 23 are related to the increased viscosity.

Examples 24(a), (b), and (c)

Emulsifying comminuted meat.—A sodium caseinate was made as follows:

| | Parts by weight |
|---|---|
| New Zealand casein | 100 |
| Water | 30 |
| NaOH solution: | |
| Water | 2.5 |
| NaOH | 2.5 |

The water was mixed into the casein and allowed to stand until the wetness changed and formed a free-flowing mass. Then half of the alkali solution was mixed in with stirring producing a damp non-sticky swollen mass changing in about 30 minutes to a free-flowing mass. Then the remainder of the alkali was added and the same conditions were repeated. The product was then compacted under heavy pressure giving an almost glassy mass, which was dried (140° F. for 8 hours) and ground.

A sausage-meat Formulation X was produced as follows:

| | Parts by weight |
|---|---|
| Lean beef | lbs 20 |
| Defatted beef hearts | lbs 20 |
| Pork back fat | lbs 60 |
| Chipped ice | lbs 40 |
| Sodium chloride | lbs 2.5 |
| Curing salt: | lbs .25 |
| Sodium chloride, 90%. | |
| Sodium nitrite, 6%. | |
| Sodium nitrate, 4%. | |
| Sodium erythorbate | oz ⅞ |
| Seasoning | ozs 8 |

Various sodium caseinates were compared in emulsifying the meat formulation, being used in amount of 3.5 pounds by weight for Formulation X, using also a control having no added protein.

Examples 24(a) to 24(c)

(a) Control.
(b) Spray-dried sodium caseinate.
(c) Glassy sodium caseinate.

The three emulsions were stuffed into 12 oz. oblong cans, sealed, and cooked at 160° F. for 90 minutes, chilled for 1 hour, and then placed in a cooler at 38° F. The next day the cans were opened and the percent of purged juices determined as follows:

| Example 24: | Percent purge |
|---|---|
| (a) | 19.78 |
| (b) | 5.86 |
| (c) | 3.19 |

This establishes the glassy sodium caseinate to be a better emulsifier than conventional spray-dried caseinate. The product of Example 21 was included in a similar test and the purge was found to be 11%, indicating an emulsifying properties than conventional spray-dried sodium caseinate and the glassy form.

Denaturing.—When the neutralized protein is heated at a denaturing temperature after adding the alkali and in the presence of free water and before completing the drying, its solubility and hydration properties are greatly reduced. Such denatured sodium caseinates make excellent protein supplements for products such as breakfast cereals or crackers, and the like, made of dough. The lack of hydration of such protein is beneficial in producing the dough. Less water is required and hence less oven time for baking.

The invention, especially for food products, is not limited to casein nor to alakli-metal.

Example 25

| | Parts by weight |
|---|---|
| Casein | 100 |
| Water | 30 |
| Ca(OH)₂ (dry powder) | 2.9 |

The water was first mixed into the casein, and after 20 minutes, the calcium hydroxide as a dry powder was added followed by additional mixing. The mass was then compressed forming semi-glassy pellets. When these pellets were dried at low temperature to 6–8% water and then ground, a caseinate was obtained which is much like spray-dried calcium caseinate. When the pellets are dried at 180° F. the protein is denatured, exhibiting little hydration, and making an excellent protein supplement for crackers and the like.

When calcium caseinate is made in the conventional way by adding calcium hydroxide to a suspension of casein in water to elevate the pH to 8 at 20% solids, the suspension can be boiled for 60 minutes without substantially denaturing the protein. By producing it according to the present invention, with or without use of compression, the solubility of the product is greatly reduced by atmospheric drying at 200° F.

The solubility of calcium caseinate is determined by suspending one gram of the dry product in water adjusted to pH of 7.2. The product of the present invention can have solubilities as low as 6% of the total nitrogen content, whereas the conventional product will have a solubility as high as 60% to 70% of the total nitrogen. The low soluble calcium caseinate of the present invention is almost sand-like in character with little or no hydration quality, being an excellent protein supplement.

Example 26.—A mixed protein

| | Parts by weight |
|---|---|
| Commercial casein | 100 |
| Wet soy protein [1] | 100 |
| Spray-dried soy protein (70% protein content) | 170 |
| Calcium hydroxide (dry) | 3 |

[1] A water suspension of 30% solids at pH 4.

The water of the wet soy protein serves to hydrate the mixed proteins before the dry calcium hydroxide is added. The product is pressed into pellets and dried at a denaturing temperature of 180° F. yielding an insoluble protein food additive. By further processing, an edible article may be produced.

By subjecting the neutralized or incompletely neutralized protein to pressure to form flakes having at least some portions thereof with the glassy or translucent form, as between rolls, and drying the flakes, the flakes have another useful characteristic. By heating the dried flakes, denatured or not, at a temperature well above 212° F., they puff by boiling the residual moisture. With dry-puffing heat a porous puffed flake is formed which can be ground to a mass of porous particles. Thus, by this procedure and selecting the protein, a new form of calcium or sodium salt of casein or of soy protein, or mixtures thereof, can be produced for use with food products.

When flavoring material is added to the protein before forming the flakes or afterwards and before or after drying, or after puffing, an edible snack is obtained by puffing, either by dry heat or by deep-frying in fat. In deep-fat frying, an expansion of as much as ten-fold can be obtained. For example, using only casein and neutralizing alkali, such as caustic soda or calcium hydroxide, and flavoring material lacking in carbohydrates, an all-protein puffed snack may be produced. By introducing into the mass before applying the pressure, carbohydrate, which may be cane sugar, or glucose, or starch, such as potato flour, processed or otherwise, or mixtures of carbohydrates, puffed snacks may be produced having varying ratios of protein to carbohydrate. And when such puffed snacks are produced by deep-fat frying, a fat content may be added.

In commercial potato chips the protein content is very low and the caloric value is largely from fat and in smaller amount from carbohydrate. By the procedure above described edible material may be made with a better balance in food value than is provided by potato chips.

From the foregoing it is to be understood that the invention is applicable in various ways and to a wide variety of natural hydrophilic proteins within the scope of the appended claims.

I claim:
1. Process for the production of dry neutralized proteinates by reacting solid material consisting essentially of hydrophilic protein with alkali in the presence of small quantities of free water characterized in that the alkali is hydroxide of alkali metal or alkali-earth metal, the amount of water being in the range from 10.4 to 40 parts of water to 60 parts of solids in the reactive mass and at least sufficient to provide during and after the reaction merely a moist crumbly-to-free-flowing mass, yet being sufficient to effect reaction of all the alkali with the protein prior to decomposition of the protein by action of the hydroxide, the free water being subsequently eliminated by drying.

2. The method of claim 1 in which the drying is effected at temperatures below denaturing temperatures.

3. The method of claim 1 in which the protein is denatured by heat before completing the drying.

4. The method of claim 1 in which the alkali is sodium hydroxide.

5. The method of claim 1 in which the alkali is calcium hydroxide.

6. The method of claim 1 in which the moist mass is rendered translucent by subjection to mechanical pressure prior to drying.

7. The method of claim 6 in which the moist pressurized mass is denatured by heat and dried.

8. The method of claim 1 in which the moist mass is rendered translucent by subjection to mechanical pressure, and in which the resulting pressurized mass is dried at below a denaturing temperature.

9. The product of the process of claim 1 in which the protein is casein and the hydroxide is calcium hydroxide.

10. Process for the production of a cooked puffed food product which comprises reacting solid material consisting essentially of hydrophilic protein with alkali in the presence of small quantities of free water, the alkali being hydroxide of alkali-metal or alkali-earth metal, the amount of water being in the range from 10.4 to 40 parts of water to 60 parts of solids in the reactive mass and at least sufficient to provide during and after reaction merely a moist crumbly-to-free-flowing mass, yet being sufficient to effect reaction of all the alkali with the protein prior to decomposition of the protein by action of the hydroxide, forming a translucent-to-glassy product by mechanically compressing material consisting essentially of the reaction mass before drying, air-drying the pressed product, and puffing the product by subjecting it to a water-boiling temperature.

11. The method of claim 10 in which the protein is casein and the alkali is sodium hydroxide.

12. A puffed food product of the process of claim 10.

13. A flavored puffed product of the process of claim 10 in which the protein is casein or soy.

14. A glassy body of protein salt which is the reaction product of hydrophilic protein with hydroxide of alkali metal or alkali-earth metal.

15. The product of claim 14 in which the protein is casein.

16. The product of claim 14 in which the protein salt is denatured.

17. The product of claim 14 in which the hydroxide is calcium hydroxide.

18. The product of claim 14 in which the protein is casein and the hydroxide is calcium hydroxide.

References Cited

UNITED STATES PATENTS

| 2,005,730 | 6/1935 | Dunham | 260—119 |
| 2,101,633 | 12/1937 | Whitaker | 99—20 |
| 2,103,153 | 12/1937 | Dunham | 260—119 |
| 3,185,574 | 5/1965 | Gabby et al. | 99—86 |
| 3,259,503 | 7/1966 | Tau et al. | 99—81 |

OTHER REFERENCES

Food Engineering, vol. 23, No. 4, April 1951, pp. 154–157.

A. LOUIS MONACELL, *Primary Examiner.*

H. H. KLARE III, *Assistant Examiner.*

U.S. Cl. X.R.

99—17, 20; 260—119, 123.5

U.S. DEPARTMENT OF COMMERCE
PATENT OFFICE
Washington, D.C. 20231

UNITED STATES PATENT OFFICE
CERTIFICATE OF CORRECTION

Patent No. 3,440,054                                                                   April 22, 1969

Louis Sair

It is certified that error appears in the above identified patent and that said Letters Patent are hereby corrected as shown below:

Column 1, line 37, "by the" should read -- by --; line 38, "alkal," should read -- alkali, --. Column 2, line 57, beginning with "the initial" cancel all to and including "It is assumed that" in line 58, and insert -- about 25% of the NaOH is unreacted. It is assumed that the initial neutralization at the surface of dry particles sets up a barrier minimizing penetration to the interior by the NaOH solution. --. Column 5, TABLE IV, line 1 thereof, cancel "21----6.9 6.2 89.0 190", first occurrence. Column 6, line 38, after "indicating an" insert -- improvement over the control, but a product with poorer --.

Signed and sealed this 7th day of April 1970.

(SEAL)
Attest:

Edward M. Fletcher, Jr.                           WILLIAM E. SCHUYLER, JR.
Attesting Officer                                            Commissioner of Patents

UNITED STATES PATENT OFFICE
CERTIFICATE OF CORRECTION

Patent No. 3,440,054      Dated April 22, 1969

Inventor(s)    LOUIS SAIR

It is certified that error appears in the above-identified patent and that said Letters Patent are hereby corrected as shown below:

Col. 3: line 63, change "16.35" to --20.27--; line 64, change "94.15" to --95.07; line 65, change "10.4" to --12.8--  Claim 1, line 6, change "10.4" to --12.8--; Claim 10, line 6, change "10.4" to --12.8--

Signed and sealed this 23rd day of January 1973.

(SEAL)
Attest:

EDWARD M. FLETCHER, JR.
Attesting Officer

ROBERT GOTTSCHALK
Commissioner of Patents